Aug. 20, 1968  G. B. STILLIT  3,397,466
APPARATUS FOR TEACHING KNOWLEDGE
Filed May 12, 1966  2 Sheets-Sheet 1

Inventor
GERALD B. STILLIT
By *Imirie & Smiley*
Attorneys

United States Patent Office 3,397,466
Patented Aug. 20, 1968

3,397,466
APPARATUS FOR TEACHING KNOWLEDGE
Gerald Barry Stillit, 15 Hill View, Primrose Hill Road,
London NW. 3, England
Filed May 12, 1966, Ser. No. 549,550
Claims priority, application Great Britain, May 19, 1965,
21,250/65
3 Claims. (Cl. 35—9)

ABSTRACT OF THE DISCLOSURE

A spaced pair of contacts of an indicating device are adapted to be electrically connected if placed within that demarked area of a multiple choice question sheet which corresponds to the correct answer for the question.

Figure 1:
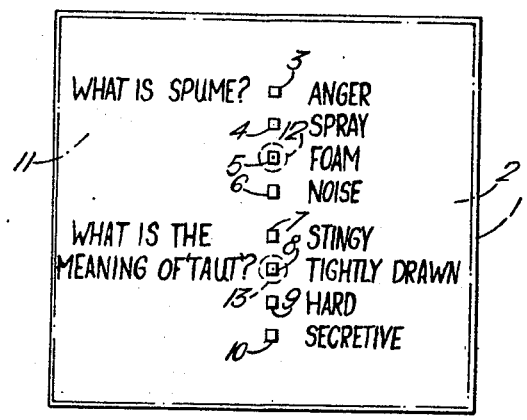

This invention relates to apparatus for teaching knowledge.

In books or other printed matter intended for use for individual study, it is common for the student using the book to be tested at various stages in his reading to inform the student as to how well his study is progressing. The test often takes the form of a sequence of questions printed in the book and usually of progressively increasing difficulty, to each of which questions the student has to choose an answer. To see whether his answers are correct, the student then has to turn to a part of the book where correct answers to all the questions are printed. Thus, he must either answer all the questions first and then check all his answers, or alternatively check each answer by turning to the appropriate page of the book each time he chooses an answer.

It has been established that a student can complete a course of study more quickly and can learn the content of the course more thoroughly if, on answering any question correctly, he is immediately informed of his success by some audio or visual indicator. This is known as "reinforcement" and has been found to act as an encouragement and a stimulant to the student in his learning.

It is a main object of the present invention to provide improved apparatus which is simple to operate, inexpensive to manufacture and which enables a student to directly receive said desirable reinforcement when studying a printed teaching course.

From its broadest aspect apparatus for teaching knowledge, according to the present invention, comprises in combination a printed sheet carrying a sequence of questions and a related group of a plurality of (e.g., four) feasible answers to each question arranged in spaced relation with each other and a demarked area adjacent to each answer, electrical conducting means related to the demarked areas associated with correct answers printed on the sheet, a manipulatable electrical contact element including two pointed electrodes the ends of which are connected to ensure simultaneous application of both electrode points in any of said demarked areas, and an energising circuit containing an indicating device and the two electrodes whereby the indicating device becomes energised, when the electrodes are applied to the demarked areas associated with the correct answers, through the related electrical conducting means.

In one embodiment of the present invention the electrical conducting means are conducting islands backing the demarked areas. Preferably the electrical conducting means are conducting islands on an insulating plane element.

In a further embodiment of the present invention the electrical conducting means consists of at least one irregular patch of electrically conducting material printed on an insulating plane element and having conducting areas which underlie the demarked areas adjacent the correct answers on the printed sheet.

The present invention further comprehends a manipulatable contact element, for use in apparatus for teaching knowledge according to the invention, comprising a holder for a dry battery, two pointed electrodes for connection to the battery terminals, the ends of the two electrodes being connected to ensure simultaneous application of both electrode points in any of said demarked areas, and an indicating device operatively connected in the battery circuit.

Apparatus for teaching knowledge, according to the present invention, may also comprise at least one printed sheet carrying a sequence of questions and related groups of a plurality of (e.g., four) feasible answers to each question arranged in spaced relation with each other, and on each sheet circuit completing means located only in the demarked area associated with the correct answer in each group.

Figure 2:
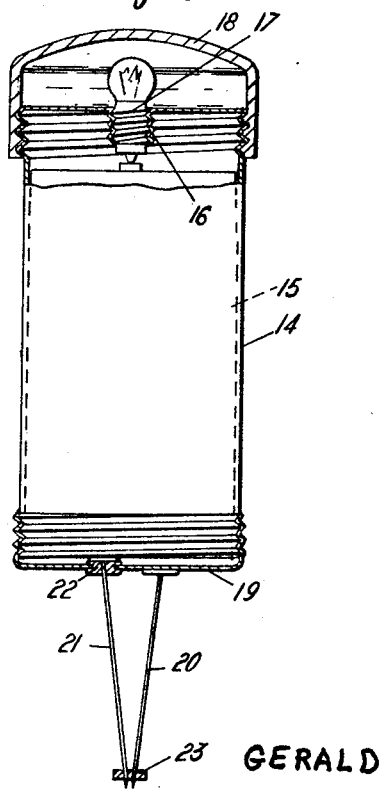
Figure 3:
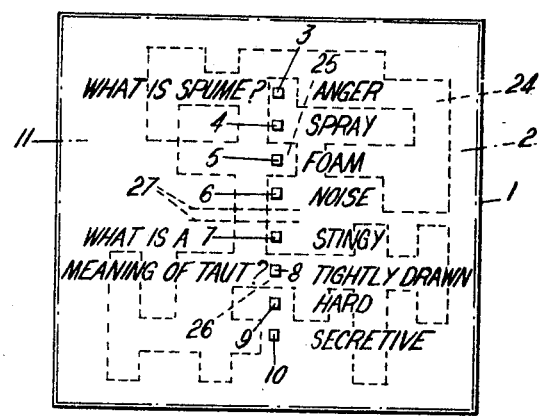

In order that the invention may be more clearly understood, two embodiments thereof will now be described, by way of example, with reference to the accompanying diagrammatic drawings, in which:

FIGURE 1 shows (in broken lines) a plane element carrying electrical conducting means constituted by conducting islands, in register with a printed sheet, in accordance with the invention, FIGURE 2 shows a longitudinal section through a manipulatable electrical contact element for use in combination with the plane element and the printed sheet shown in FIGURE 1, and FIGURE 3 shows an alternative plane element in accordance with the invention, including electrical conducting means in the form of an irregular patch of electrically conducting material, the plane element being in register with a printed sheet and being for use with the contact element of FIGURE 2.

Referring to FIGURE 1 of the drawings, a printed sheet 1 is shown and, behind and in register with the printed sheet, a plane element 2 is shown in broken lines.

On the face of the sheet 1 are printed a sequence of two questions, namely "what is spume?" and "what is the meaning of taut?" and a group of four feasible answers related to each question, the answers of each group being arranged in spaced relation with each other down the sheet next to the respective question. Adjacent to each of the feasible answers an area is demarked by a square printed on the sheet. The eight demarked areas are indicated by reference numerals 3 to 10.

The plane element consists of a laminar base 11 of electrically insulating material, for example, an industrial plastics material, on the front face of which are two islands 12 and 13 of electrically conductive material, preferably applied to the base by any of the known techniques for printing metal circuits on to insulating bases.

The electrically conductive islands 12 and 13 on the plane element 2 are so related to the demarked areas 3 to 10 that when the platen 2 is in register with and behind the printed sheet 1, the only demarked areas which are backed by the conductive islands 12 and 13 are those adjacent the correct answers, "foam" and "tightly drawn," that is, the demarked areas 5 and 8 respectively.

For the sake of clarity, the plane element shown in FIGURE 1 is formed with only two conductive islands, but in general the plane element will be adapted for use with a number of different printed sheets by forming the plane element with a greater number of electrically conductive islands so arranged that the demarked areas adjacent the correct answers on any one of the printed sheets will each overlie a conductive island when the sheet is in register with the plane element.

FIGURE 2 shows a manipulatable contact element for use with the plane element and the printed sheet shown in FIGURE 1, which contact element comprises a sheet metal casing 14 for a conventional dry battery 15 (shown in broken lines), the casing 14 being formed at its upper end with a central threaded socket 16 into which an electric bulb 17 is screwed to contact the central terminal of the battery 15. The casing 14 is threaded externally at both ends to receive a transparent cover 18 for the bulb 17 at its upper end, and a metal cap 19 at its lower end.

An energising circuit contains the bulb 17 and two pointed metal electrodes 20 and 21, the electrode 20 being secured (e.g., by soldering, brazing or welding) directly to the cap 19, and thus being connected through the metal cap 19, the metal casing 14 and the bulb 17, to the central terminal of the battery 15. The electrode 21 is held in a grommet 22 of insulating material and projects through the cap 19 so that the electrode 21 is in contact with the outer terminal of the battery 15.

The ends of the electrodes 20 and 21 are rigidly connected in juxtaposition by an insulating spacer 23. The close spacing of the electrode points ensure that when the contact element is applied in any of the demarked areas both the electrode points will be applied simultaneously in the demarked area.

The casing 14 may alternatively be made from an industrial plastics material. In this case it cannot act as a lead and so a separate wire must be included in the energising circuit to connect the electrode 20 to the bulb 17.

In using the apparatus, the student inserts the plane element 2 behind the printed sheet 1 and selects from among the feasible answers to a particular question what he considers to be the correct answer. He then pierces the printed sheet in the demarked area associated with the selected answer with the sensor of the manipulatable contact element formed by the two juxtaposed electrodes 20 and 21. If the selected answer is a correct one, both the electrodes pierce the printed sheet 1 and will simultaneously contact the electrically conductive island lying behind the demarked area, and the energising circuit containing the battery 15, the bulb 17, the casing 14, the cap 19 and both electrodes 20 and 21 will be completed through the conductive island, thereby lighting the bulb 17 to indicate to the student that his selected answer is correct and to give him the desired reinforcement.

Although in the plane element just described, the electrically conductive islands are printed on the face of the plane element, the plane element may, according to the invention, be of a different construction, for example, the conductive islands may consist of metal discs set into the surface of the plane element.

In FIGURE 3 of the drawings the printed sheet 1 has the same form as the printed sheet in FIGURE 1 of the drawings but the plane element 2 shown in broken lines consists of a laminar base 11 made of an industrial plastics material, to the front of which is applied conducting means constituted by an irregular patch 24 of metal printed on the front face of the laminar base.

It will be seen that when the printed sheet 1 and the plane element 2 are in register with each other, as shown in FIGURE 3, the demarked areas 5 and 8 associated with the correct answers to the two questions on the sheet overlie respective areas 25 and 26 of the conducting patch 24, while the demarked areas associated with the incorrect answers overlie insulating parts of the plane element 2.

In use the manipulatable contact element shown in FIGURE 2 is applied in the demarked area adjacent whichever answer the student considers to be the correct one and if the student has chosen correctly both the electrodes of the contact element will pierce the printed sheet and contact the conducting area 25 or 26 underlying the demarked area, to complete the electrical circuit through the two electrodes 20 and 21, the battery 15 and the bulb 17 so as to inform the student of his correct choice.

Thus it will be seen that the irregular conducting patch on the plane element, as shown in FIGURE 3, and the conducting islands on the plane element, as shown in FIGURE 1, both act as circuit completing means to complete the circuit through the juxtaposed electrodes, the battery and the bulb when the student selects a correct answer.

The circuit completing means is shown as a single irregular conducting patch 24 in FIGURE 3, but the patch may be divided into two patches (as shown at 27 in FIGURE 3) or more. It will be appreciated that the conducting patch or patches may be of any configuration which ensures that the demarked area adjacent each correct answer on the printed sheet will overlie conducting material when the plane element is in register with the printed sheet.

In a further embodiment of the invention the electrical conducting means in the form of conducting islands or an irregular patch may be integral with the printed sheet, for example, islands or an irregular patch or patches made of metal foil may be fixed on the reverse side of the printed sheet, backing the demarked areas of the correct answers only, or the islands or irregular patches may be constituted by conducting ink printed on to the back of the sheet.

It will be appreciated that the combination of the contact element having two juxtaposed pointed electrodes for piercing the printed sheet, and electrical conducting means located behind the printed sheet, either on the back of the sheet itself or on a plane element (rigid or supple) inserted behind the sheet, is particularly advantageous in that the student is not given any visual clue as to which answer is correct and the necessity for any further precaution such as "dummy" conductors to prevent visual detection of correct answers is avoided.

The indicating device may be a buzzer, giving an audible indication instead of a visual one.

The printed sheets may be incorporated into an instructional book, the sequence of questions on the printed pages of the book being devised as a progressive programme of test questions to provide maximum help to the student in his learning.

Where a plane element carrying conducting islands or an irregular conducting patch or patches is to be used with such a book, conducting islands are provided in sufficient number, or the irregular conducting patch or patches are made sufficiently complex to allow the correct answers on each page to be scattered in an apparently random way on the sheet so that the user of the apparatus cannot memorise the positions of the correct answers.

It will be understood that when the sheets are incorporated into a book the plane element is to be inserted behind each sheet in turn as the student studies successive sheets and the plane element must be sufficiently thin to be inserted between the sheets without causing damage to the book. The thin plane element may conveniently be provided with registering means such as a flange along one or more sides to facilitate locating the plane element in register with the printed sheet.

It will be appreciated that in electrical apparatus according to the present invention intended for use with a book, the spacing of the printing on the pages, as determined by the printing machine used to produce the book, must be taken into account in devising the disposition of the electrical conducting means on the plane element.

It will be understood that the apparatus for teaching knowledge, as described herein, is cheap to produce, is simple to use and provides the desirable reinforcement for the student using the apparatus.

I claim:

1. Apparatus for teaching knowledge, comprising in combination a printed sheet carrying a sequence of questions and a related group of a plurality of (e.g., four) feasible answers to each question arranged in spaced relation with each other and a demarked area adjacent to each answer, electrical conducting means located behind the printed sheet, said conducting means underlying only the demarked areas asociated with correct answers printed on the sheet, a manipulatable electrical contact element including two pointed electrodes, an insulating spacer rigidly connecting the ends of the electrodes in juxtaposition to ensure simultaneous application of both electrode points in any of said demarked areas, and an energising circuit containing an indicating device a dry battery and the two electrodes whereby the indicating device becomes energised, when the electrodes are applied to the demarked areas associated with the correct answers, through the related electrical conducting means, said demarked areas being of a size substantially greater than the spacing between said electrode points as established by said insulating spacer and said electrical conducting means presenting electrical conducting surfaces behind those demarked areas associated with the correct answers which are commensurate in area to said demarked areas, said electrodes being elongate and connected at one end to said manipulatable element and joined at their opposite free ends by said insulating spacer, leaving resilient lengths thereof in between to allow resilient movement of the electrodes for simultaneous contact of both electrodes against an electrical conducting surface.

2. Apparatus according to claim 1, further comprising an insulating plane element freely movable to be placed under said printed sheet, said plane element being sufficiently thin to be inserted between the pages of a book comprising said printed sheet as one of many similar pages in the book, said plane element carrying the said electrical conducting means, and also carrying means for registering the plane element with respect to the printed sheet to operatively relate the conducting means to demarked areas so that the said conducting means underlie only said demarked areas relating to correct answers.

3. Apparatus according to claim 2, wherein said thin plane element carries at least one irregular patch of electrically conducting material printed thereon, areas of which material underlie said demarked areas relating to correct answers when the plane element is located in register with the printed sheet.

References Cited
UNITED STATES PATENTS

| | | | |
|---|---|---|---|
| 2,546,666 | 3/1951 | Fleischer | 35—9 |
| 2,724,910 | 11/1955 | Kelly | 35—9 |
| 3,057,082 | 10/1962 | Wellington et al. | 35—9 |
| 3,141,244 | 7/1964 | Smith | 35—9 |

EUGENE R. CAPOZIO, *Primary Examiner.*

R. W. WEIG, *Assistant Examiner.*